United States Patent
Jacob et al.

(10) Patent No.: US 8,099,249 B2
(45) Date of Patent: Jan. 17, 2012

(54) METHOD AND SYSTEM FOR DETECTION AND COMPENSATION OF A RAPID TEMPERATURE CHANGE ON A PRESSURE MEASUREMENT CELL

(75) Inventors: Joern Jacob, Kirnbach (DE); Holger Gruhler, Tuningen (DE)

(73) Assignee: Vega Grieshaber KG, Wolfach (DE)

( * ) Notice: Subject to any disclaimer, the term of this patent is extended or adjusted under 35 U.S.C. 154(b) by 318 days.

(21) Appl. No.: 12/564,420

(22) Filed: Sep. 22, 2009

(65) Prior Publication Data

US 2010/0125425 A1 May 20, 2010

Related U.S. Application Data

(60) Provisional application No. 61/122,299, filed on Dec. 12, 2008.

(30) Foreign Application Priority Data

Nov. 20, 2008 (EP) .................................... 08020222

(51) Int. Cl.
*G01F 17/00* (2006.01)
(52) U.S. Cl. ......................................................... 702/50
(58) Field of Classification Search ................... 702/50, 702/52, 53, 98, 138
See application file for complete search history.

(56) References Cited

U.S. PATENT DOCUMENTS

| | | | |
|---|---|---|---|
| 3,905,237 A | 9/1975 | Smalarz et al. | |
| 5,770,802 A | 6/1998 | Berthold et al. | |
| 7,783,448 B2 * | 8/2010 | Hutchinson | 702/138 |
| 2007/0209443 A1 | 9/2007 | Yoshikawa et al. | |

FOREIGN PATENT DOCUMENTS

| | | |
|---|---|---|
| DE | 3212218 A1 | 12/1982 |
| DE | 41 42 101 A1 | 6/1993 |
| EP | 0480170 | 12/1995 |
| EP | 1596174 A2 | 11/2005 |
| EP | 1186875 B1 | 9/2007 |
| WO | WO 2008/001602 | 1/2008 |

* cited by examiner

*Primary Examiner* — Drew A Dunn
*Assistant Examiner* — Stephen Cherry
(74) *Attorney, Agent, or Firm* — Andrew F. Young, Esq.; Lackenbach Siegel, LLP

(57) ABSTRACT

The invention is a method and system for detection and compensation of a rapid change in temperature on a pressure measurement cell, in which a measurement signal proportional to the deflection of a diaphragm is generated by means of a sensor. A reference signal proportional to the deflection of the diaphragm is generated by a second sensor; and, measured values are generated by a microprocessor from the measurement signal while the respective reference values are generated from the reference signal. The reference values are compared with the expected values from a tolerance band, and either a pressure-induced deflection of the diaphragm is detected when there is a correspondence, and the measured values are output as measured values for the measured pressure; or, if there is not a correspondence, a deflection of the diaphragm due to a rapid change in temperature is detected, the measured values are corrected and output.

20 Claims, 4 Drawing Sheets

METHOD AND SYSTEM FOR DETECTION AND COMPENSATION OF A RAPID TEMPERATURE CHANGE ON A PRESSURE MEASUREMENT CELL

CROSS REFERENCE TO RELATED APPLICATIONS

This application is related to, and claims priority from, U.S. Provisional Patent Application Ser. No. 61/122,299, filed Dec. 12, 2008, and European Patent Application EP 08 020222.9 filed Nov. 20, 2008, the entire contents of each of which are incorporated herein by reference.

FIGURE SELECTED FOR PUBLICATION

FIG. 3

BACKGROUND OF THE INVENTION

1. Field of the Invention

The present invention relates to a method and system for detection of, and compensation for, the rapid change in temperature on a pressure measurement cell. More specifically, the present invention relates to the detection and measurement of the temperature change by generating a measurement signal and a reference signal proportional to the deflection of a diaphragm and establishing a reference band therefrom.

2. Description of the Related Art

The related art involves the development and use of pressure measurement cells. Pressure measurement cells are known from EP 1186875 B1, for example. Such a pressure measurement cell usually consists of a base body and a measurement diaphragm, with a shallow recess provided on the base body, covered completely by the diaphragm which, together with the recess, forms a pressure chamber. Electrodes, which together form a measurement capacitor whose measurement signal is analyzed, are provided on the inside of the diaphragm and in the recess. To compensate for interference effects such as temperature or drift, a reference capacitor is set up next to the measurement capacitor.

If such a pressure measurement cell is in thermal equilibrium with its environment, the temperature dependence of the pressure measurement can be compensated by means of a temperature sensor installed on the back side of the base body. A rapid change in temperature, e.g., a so-called thermal shock, may lead to stresses in the diaphragm of the pressure measurement cell, resulting in incorrect measured values due to the resulting deflection of the measurement diaphragm. The stresses in the diaphragm result from a difference in temperature between a medium acting on the diaphragm of the pressure cell and the base body of the pressure measurement cell which carries the diaphragm and faces away from the medium but is thermally connected to the environment.

This problem is solved according to EP 1186875 B1 cited above by the fact that a second temperature sensor is set up in the direction of an expected temperature gradient, namely in a connecting layer between the diaphragm and the base body carrying this diaphragm. Changes in temperature with a steep temperature gradient can thus be detected rapidly, so that thermal shocks can be differentiated from an actual change in pressure and can be compensated.

What is not appreciated by the prior art is that one disadvantage of this known approach is that with larger measurement ranges (e.g., 60 bar), a change in temperature can be detected only with a time lag because of the thick diaphragm. However, changes in measurement signal due to thermal shock must take place very rapidly, so that error compensation by means of the two temperature sensors is highly inadequate, in particular when there is a large measurement range.

In addition, the production of such a pressure measurement cell according to EP 1186875 B1 is very complex and, therefore, also expensive, because introducing a temperature sensor into the joint area between the diaphragm and the base body of the pressure measurement cell as well as contacting it and analyzing the signal are associated with additional expense.

Accordingly, there is a need for an improved a method for detection of, and compensation for, the rapid change in temperature on a pressure measurement cell based on the finding that deformation of the diaphragm due to pressure differs significantly in terms of measurement technology in comparison with deformation of a diaphragm due to thermal shock.

ASPECTS AND SUMMARY OF THE INVENTION

The present invention relates to a method and system for detection and compensation of a rapid change in temperature on a pressure measurement cell, in which a measurement signal proportional to the deflection of the diaphragm is generated by means of a first sensor device arranged on a diaphragm acting under pressure; a reference signal proportional to the deflection of the diaphragm is generated by means of a second sensor device arranged on the diaphragm acting under pressure; and measured values are generated by a microprocessor from the to measurement signal and the respective reference values are generated from the reference signal. According to the invention, a tolerance band for expected values of the reference values is stored in a memory of the microprocessor as a function of the measured values; the reference values currently generated are compared with the expected values from the tolerance band, and either a pressure-induced deflection of the diaphragm is detected when there is a correspondence, and the measured values are output as measured values for the measured pressure, or if there is not a correspondence, a deflection of the diaphragm due to a rapid change in temperature is detected, the measured values are corrected with a correction value and the corrected measured values are output as measured values for the measured pressure.

An aspect of the present invention is to provide a method and system which allows detection of a rapid change in temperature, i.e., a thermal shock without any time lag and with subsequent compensation, while also allowing an implementation without additional costs. This aspect is achieved by a method for detection and compensation of a rapid change in temperature on a pressure measurement cell.

In this regard, FIG. 1 shows, in a diagram, the dependence of the change in distance of the diaphragm from the base body of a pressure measurement cell on the distance from the midpoint of the diaphragm, i.e., from the midpoint radially to the edge which develops into a glass seam area. The measurement is performed with a measurement capacitor $C_{mess}$ and a reference capacitor $C_{ref}$ with a circular electrode of measurement capacitor $C_{mess}$ having a radius of approx. 5.5 mm being arranged centrally on the opposing side of the diaphragm and a circular electrode having the reference capacitor $C_{ref}$ surrounding this circular electrode at a distance. The respective second electrode is formed by a shared electrode on the inside of the diaphragm on the opposite side.

The curves 1 and 2 were generated by an FEM (finite element method) simulation, in which curve 1 shows the change in distance over the radius after a thermal shock from 20° C. to 80° C. after 5 sec, while curve 2 shows the changes in distance over the radius at a reduced pressure of 0.32 bar. In particular, it can be seen here that under thermal shock the diaphragm is deflected to a much greater extent in the edge area in comparison with the prevailing deformation in the central area, i.e., the diaphragm shows much greater changes in distance with regard to the deformation at the center than under a compressive load.

This difference in the behavior of the diaphragm, in particular in its edge area, is utilized by the present invention in terms of the measurement technology for detection of deformations in the diaphragm due to thermal shock by analyzing the respective relationship of the measured values and/or reference values for the two cases. Therefore, the pressure measurement cell requires no additional design measures in comparison with the state of the art but instead it is sufficient to use for the analysis a conventional inexpensive microprocessor that is also required for converting the measurement signals of the sensor devices into measured values.

First, a tolerance band for expected values of the respective reference value for all measured values generated by a first sensor device is stored in a memory of the microprocessor because it is known that with a deflection of the diaphragm due to pressure, the reference value must be in a certain relationship to the measured value. By comparison of the reference values currently stored with the expected values from the tolerance band, a decision is made regarding whether there has been a deflection of the diaphragm due to pressure or a deflection of the diaphragm due to a rapid change in temperature, for example, a thermal shock. In the event of a correspondence with an expected value, i.e., when the current reference value is within the tolerance range, then there is a deformation of the diaphragm due to pressure, so that the measured value can be output as a current measured pressure value. In the other case, a rapid change in temperature, e.g., a thermal shock, is detected, with the result being the correction of the measured value by means of a correction value.

In comparison with an actual change in pressure, the difference in behavior of the diaphragm in a thermal shock occurs without any time lag, so the speed of the analysis is advantageously limited only by the operating speed of the microprocessor. There are also no restrictions with regard to the size of the measurement range.

In a further embodiment of the invention, a table of correction values is stored in a memory of the microprocessor, assigning a correction value to each difference value between a reference value and its expected value as a function of the change in direction of a change in measured value due to a rapid change in temperature, and when a rapid change in temperature is detected, e.g., a thermal shock, the measured values are corrected by the microprocessor with the correction values from the correction table, which are assigned to the respective difference between the reference value and the expected value assigned to the measured value. The measured values corrected in this way are output as the "true" measured values for the measured pressure.

Thus, a very accurate correction of the measured value can be performed if first the required correction values have been recorded on the basis of measurement series using the pressure measurement cell with different temperature profiles.

In another further and optional embodiment, the measured value is corrected on detection of a rapid change in temperature, e.g., a thermal shock, due to the fact that by means of the microprocessor, the integration time for creating the measured the values from the measurement signals is lengthened until the reference values are again within the tolerance band of the expected values of the reference values. This is a very simple and thus also rapid correction process because no additional process steps are necessary in comparison with a convention signal analysis.

In a further and optional embodiment of the invention, the measurement signals and the reference signals are each generated by a capacitive sensor. It is especially advantageous to arrange the capacitive sensor of the first sensor device centrally on the diaphragm for detection of the deflection in the central area and to arrange the capacitive sensor of the second sensor device in the edge area of the diaphragm to detect the deflection in the edge area of the diaphragm. The effect of the difference in behavior of the diaphragm under pressure load or under a thermal shock as described above can thus be utilized maximally.

The above, and other aspects, features and advantages of the present invention will become apparent from the following description read in conduction with the accompanying drawings, in which like reference numerals designate the same elements.

DETAILED DESCRIPTION OF THE PREFERRED EMBODIMENTS

Figure 1:
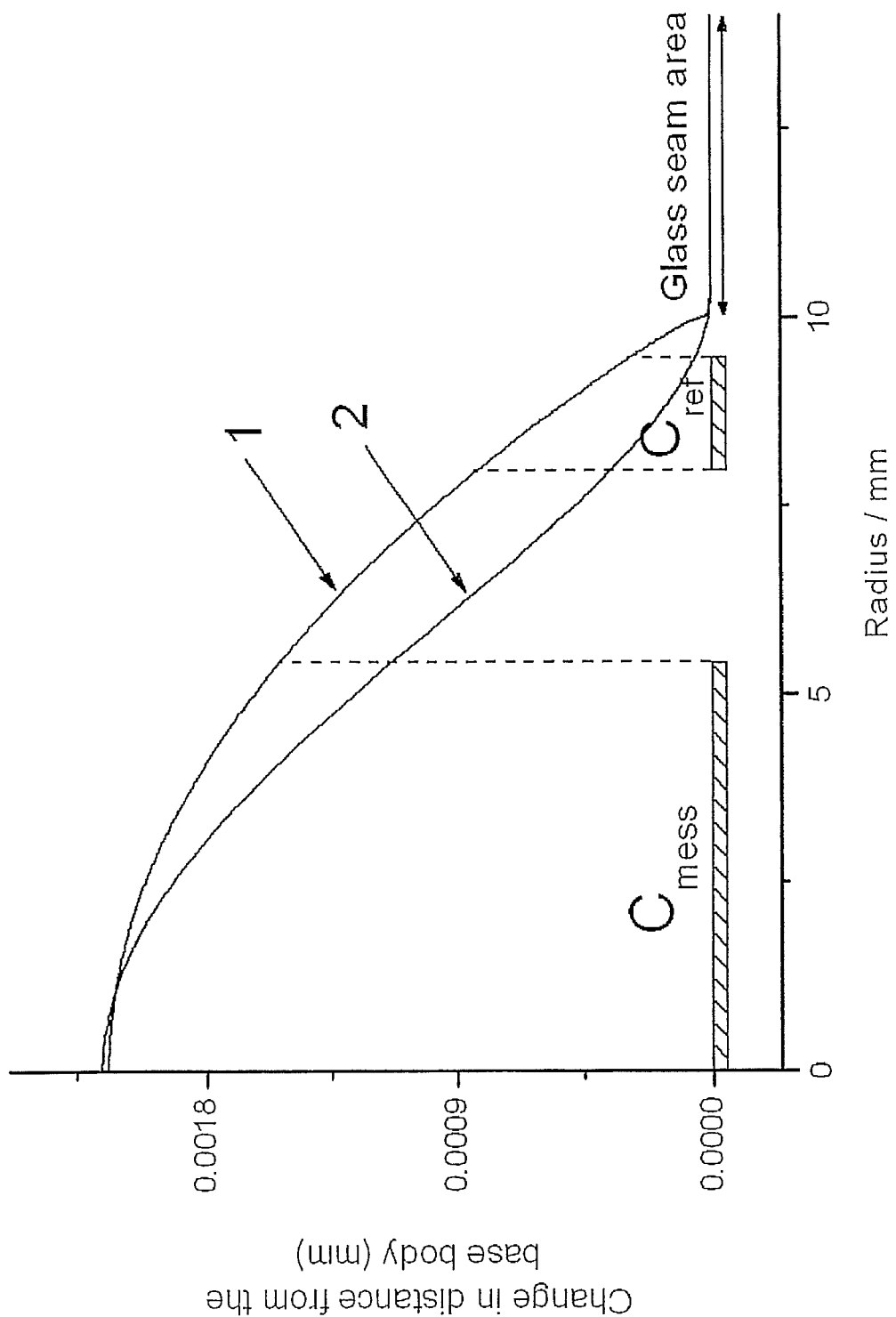
FIG. 1 shows a diagram to illustrate the diaphragm deformation under a thermal shock and a pressure load.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, and below may be used with respect to the drawings. These and similar directional terms should not be construed to limit the scope of the invention in any manner. The words "connect," "couple," and similar terms with their inflectional morphemes do not necessarily denote direct and immediate connections, but also include connections through mediate elements or devices.

FIG. 1, illustrates the dependence of the change in distance of the diaphragm from the base body of a pressure measurement cell on the distance from the midpoint of the diaphragm, i.e., from the midpoint radially to the edge which develops into a glass seam area. The measurement is performed with a measurement capacitor $C_{mess}$ and a reference capacitor $C_{ref}$, with a circular electrode of measurement capacitor $C_{mess}$ having a radius of approx. 5.5 mm being arranged centrally on the opposing side of the diaphragm and a circular electrode having the reference capacitor $C_{ref}$ surrounding this circular electrode at a distance. The respective second electrode is formed by a shared electrode on the inside of the diaphragm on the opposite side.

The curves 1 and 2 were generated by an FEM (finite element method) simulation, in which curve 1 shows the change in distance over the radius after a thermal shock from 20° C. to 80° C. after 5 sec, while curve 2 shows the changes in distance over the radius at a reduced pressure of 0.32 bar. In particular, it can be seen here that under thermal shock the diaphragm is deflected to a much greater extent in the edge area in comparison with the prevailing deformation in the central area, i.e., the diaphragm shows much greater changes in distance with regard to the deformation at the center than under a compressive load.

Figure 2:
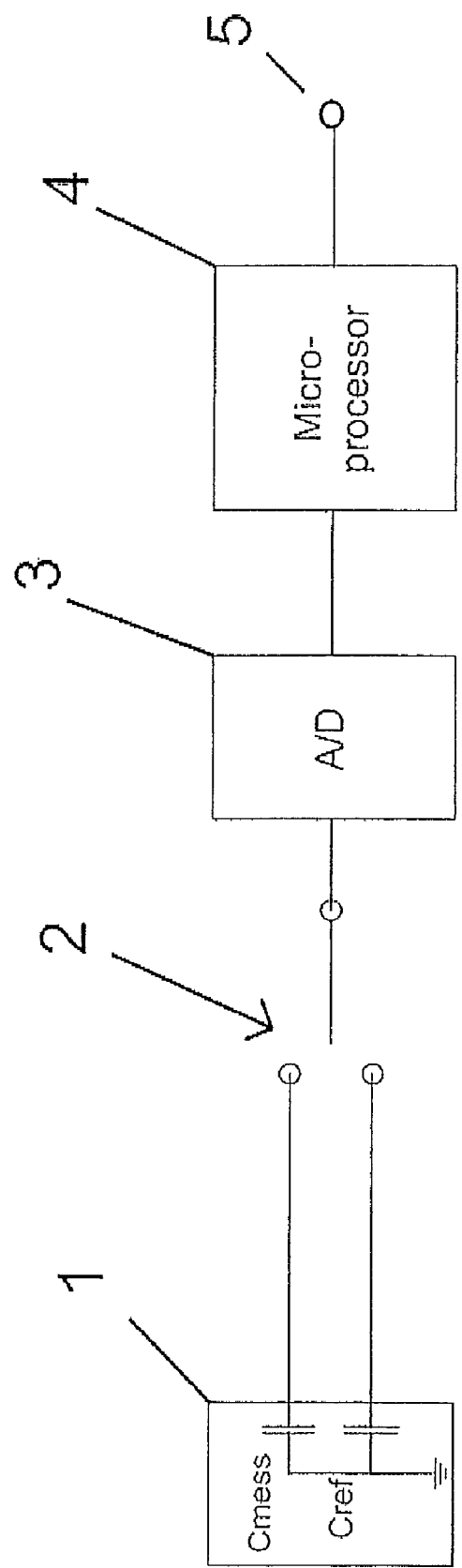
FIG. 2 shows a block diagram for the analysis of the signals generated by a pressure measurement cell.

FIG. 2 shows schematically a pressure measurement cell 10, for example, a capacitive ceramic pressure measurement cell in which a measurement capacitor $C_{mess}$ and a reference capacitor $C_{ref}$ are arranged as sensors on a diaphragm of the pressure measurement cell as sensors. The measurement capacitor $C_{mess}$ is situated centrally on the diaphragm to detect the deflections of the diaphragm there, while $C_{mess}$ in the reference capacitor $C_{ref}$ surrounds the central measurement capacitor the shape of a circle and is arranged in the edge area of the diaphragm.

The measurement signal generated by the measurement capacitor $C_{mess}$ and/or the reference signal generated by the reference capacitor $C_{ref}$ is/are sent to a reversing switch 20, which is connected to the input of an A/D converter 30. With this reversing switch 20, the signals of the measurement capacitor $C_{mess}$ and of the reference capacitor $C_{ref}$ are measured in alternation, then each is digitized by the A/D converter 30 and sent to a microprocessor 40 for generating a measured value $C_m$ ($C_m$=measured value from signal of $C_{mess}$) and/or a reference value $C_r$ and for analysis of same, and the microprocessor then makes available a signal output 50.

If the microprocessor 40 finds that the measured value $C_m$ of the measurement capacitor $C_{mess}$ changes very rapidly, then the reference value $C_r$ ($C_r$=reference value from signal from $C_{ref}$) of the reference capacitor $C_{ref}$ is used to ascertain whether this rapid increase in the measured value is based on an increase in pressure, i.e., a pressure load on the diaphragm, or whether a thermal shock was responsible for it.

Figure 3:
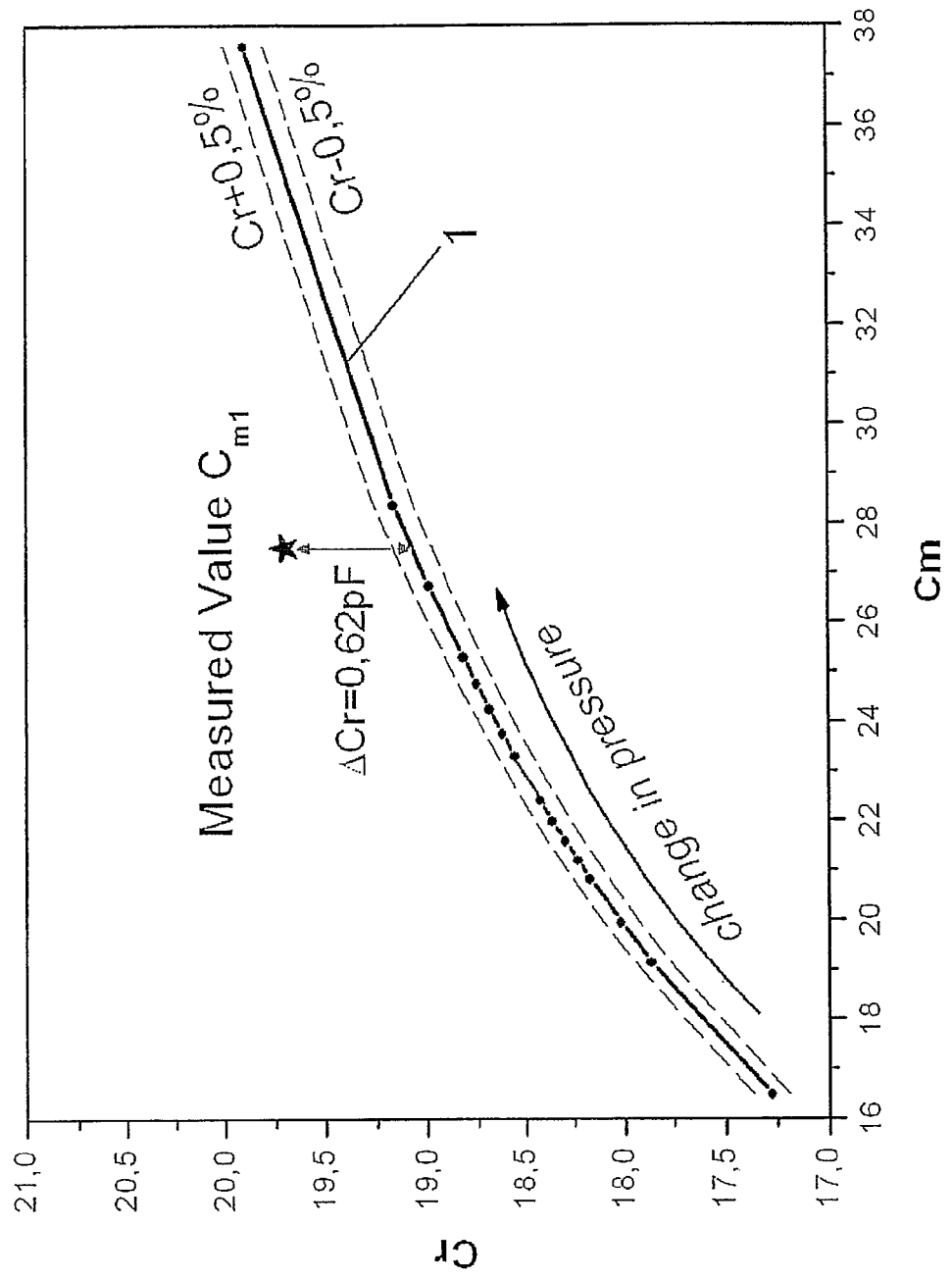
FIG. 3 shows a diagram to illustrate a tolerance band for the expected values of a reference value as a function of the measured values.

If the cause lies in a rapid increase in pressure, then the reference value $C_r$ must also change with it accordingly, as depicted in the diagram according to FIG. 3.

In this diagram, capacitance values of the measured value $C_m$ from 16 pF to 39 pF are plotted on the x axis, and capacitance values of the reference value $C_r$ from 17.0 pF to 21.0 pF are plotted on the y axis. The approximately linear curve 75 shows the relationship between a measured value $C_m$ and a respective reference value $C_r$ as an ideal value with an increase in the pressure change, whereby a tolerance band T is predefined, which is at ±0.5% of the setpoint value of the reference value, for example. The reference values in the tolerance band T are referred to as expected values of the reference values.

This diagram according to FIG. 3 is stored in a memory of the microprocessor 40. If the value pairs of the measured value $C_m$ and the reference value $C_r$ are in a tolerance band T according to FIG. 3, then a pressure load on the diaphragm is assumed and the microprocessor 40 outputs the measured value $C_m$ as the "true" measured value for the pressure at its signal output 50.

If this value pair is not in the tolerance band T according to FIG. 3, then it is assumed that this is a rapid change in temperature, i.e., a thermal shock and therefore the measured value $C_m$ must be corrected before being output to the signal output.

As an example, such a measured value $C_{ml}$ is shown in FIG. 3, its reference value having a difference from the expected reference value, i.e., the respective expected value of $\Delta C_r$=0.62 pF.

Figure 4:
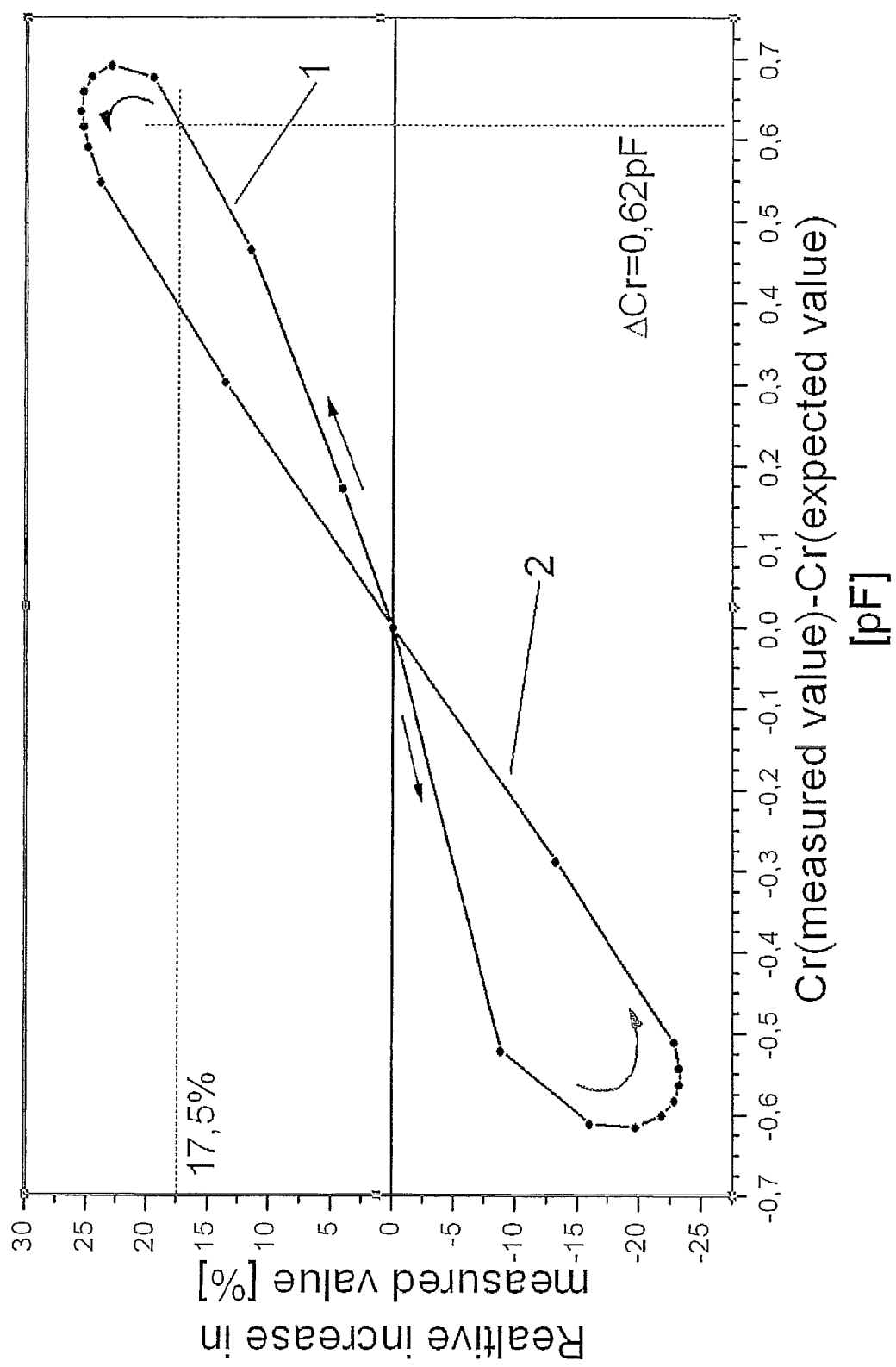
FIG. 4 shows a diagram to determine a correction value for the measured value as a function of the deviation of a reference value from its expected value.

The correction value was determined by means of a diagram as shown in FIG. 4. Difference values $\Delta C_r$ in pF are plotted on the x axis, where these difference values $\Delta C_r$ are calculated from the difference between the reference values $C_r$ and the respective expected values. Relative measured value corrections in percentage values from −30% to +30% are plotted on the y axis. The hysteresis curve 85 shows the plot of the correction values in a thermal shock from hot to cold, while conversely, hysteresis curve 2 shows the plot of the correction values from cold to hot. The arrows at curves 85 and 95 each show the direction of the change.

This diagram is also stored as a table in the memory of the microprocessor 40, which determines a correction value for the measured valued $C_{ml}$ from FIG. 3, for example, on the basis of this table.

The value $\Delta C_r$=0.62 pF which is determined on the abscissa leads to two points of intersection with the curve 85. Therefore, the microprocessor 40 first determines the direction of change in the measured value to ascertain the branch of the hysteresis curve 85 where measured value $C_{ml}$ is located. In FIG. 4, the point of intersection with the ascending branch of the hysteresis curve 85 is selected, leading to a correction value of 17%. The measured value $C_{ml}$ is thus reduced by 17.5% and is sent as the "true" measured value of the pressure to the signal output 50 of the microprocessor 40.

The measured value $C_{ml}$ may also be corrected by another method. To determine a measured value $C_m$ or a reference value $C_r$ from the corresponding signals, the digitized signals are integrated over a certain period of time. This period of time may be used for compensation of the measured value $C_{ml}$ by continuing the integration time on detection of a thermal shock until the reference value $C_r$ of this measured value $C_{ml}$ is again within the tolerance band to FIG. 3. Next the integration time is again reset at a conventional value. Through such an integration, which represents an averaging, the interfering influences on the diaphragm due to thermal shock can be eliminated or at least greatly diminished.

In the claims, means, or step-plus-function clauses, are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it is to be understood that the invention is not limited to those precise embodiments, and that various changes, modifications, and adaptations may be effected therein by one skilled in the art without departing from the scope or spirit of the invention as defined in the appended claims.

What is claimed is:

1. A method for detection and compensation of a rapid change in temperature on a pressure measurement cell, said method comprising the steps of:
   (a) generating, by means of a first sensor device arranged on a diaphragm acting under pressure, a measurement signal proportional to the deflection of said diaphragm;
   (b) generating a reference signal proportional to the deflection of said diaphragm by a second sensor device arranged on said diaphragm acting under pressure;

(c) generating a set of measured values from said measurement signal by a microprocessor; and
(d) generating a set of respective reference values from said reference signal, characterized in that:
  (i) a tolerance band for a set of expected reference values is stored in a memory of said microprocessor as a function of said measured values, and
  (ii) said reference values are compared with said set of expected values from said tolerance band, and if there is a correspondence between said set of expected values and said tolerance band then:
    (1) a pressure-induced deflection of the diaphragm is detected when there is a correspondence, and said measured values are output as measured values for said measured pressure; and, if there is no correspondence between said set of expected values and said tolerance band then:
    (2) a deflection of the diaphragm due to a rapid change in temperature is detected; said measured values are corrected with a correction value; and, said corrected measured values are output for the measured pressure.

2. The method according to claim 1, further comprising the steps of:
  (a) assigning a correction value, by a correction value table stored in the memory of said microprocessor, to each difference between a reference value outside of said tolerance band and its expected value as a function of a direction of change in a measured value change due to a rapid change in temperature; and
  (b) correcting, by said microprocessor using said correction values from said correction table, said measured values, when a rapid change in temperature is detected, which are assigned to a difference between a reference value and an expected value belonging to said measured value.

3. The method according to claim 2, further comprising the step of generating, by means of a capacitive sensor, said measurement signals and said reference signals.

4. The method according to claim 1, further comprising the step of correcting said measured values when a rapid change in temperature is detected by said microprocessor prolonging the integration time for generating the measured values from said measurement signals until the reference values are again within said tolerance band of said expected values of said reference values.

5. The method according to claim 4, further comprising the step of generating, by means of a capacitive sensor, said measurement signals and said reference signals.

6. The method according to claim 5, comprising the further step of arranging centrally on said diaphragm said capacitive sensor of said first sensor device to detect said deflection in said central area of said diaphragm.

7. The method according to claim 5, comprising the further step of arranging in an edge area of said diaphragm said capacitive sensor of said second sensor device to detect said deflection in said edge area of said diaphragm.

8. The method according to claim 1, further comprising the step of generating, by means of a capacitive sensor, said measurement signals and said reference signals.

9. The method of claim 1, wherein said rapid change in temperature on said pressure measurement cell, is logged and recorded by a data processing system for use in a report.

10. A system for detection and compensation of a rapid change in temperature on a pressure measurement cell, said system comprising:
  (a) a first sensor device, arranged on a diaphragm acting under pressure, for generating a measurement signal proportional to the deflection of said diaphragm;
  (b) a second sensor device, arranged on said diaphragm, for generating a reference signal proportional to the deflection of said diaphragm;
  (c) a microprocessor for generating a set of measured values from said measurement signal and generating a set of respective reference values from said reference signal; and
  (d) a memory of said microprocessor for storing a tolerance band for a set of expected reference values as a function of said measured values; and, wherein said reference values are compared with said set of expected values from said tolerance band, and if there is a correspondence between said set of expected values and said tolerance band then:
    (i) a pressure-induced deflection of the diaphragm is detected when there is a correspondence, and said measured values are output as measured values for said measured pressure; and, if there is no correspondence between said set of expected values and said tolerance band then:
    (ii) a deflection of the diaphragm due to a rapid change in temperature is detected; said measured values are corrected with a correction value; and, said corrected measured values are output for the measured pressure.

11. The system of claim 10, further comprising a correction value table stored in the memory of said microprocessor, for assigning a correction value to each difference between a reference value outside of said tolerance band and its expected value as a function of a direction of change in a measured value change due to a rapid change in temperature.

12. The system of claim 10, wherein said capacitive sensor of said first sensor device is arranged centrally on said diaphragm to detect said deflection in a central area of said diaphragm.

13. The system of claim 10, wherein said capacitive sensor of said second sensor device is arranged within an edge area on said diaphragm to detect said deflection in said edge area of said diaphragm.

14. A method for detection and compensation of a rapid change in temperature on a pressure measurement cell, the method comprising the steps of:
  (a) generating a measurement signal proportional to the deflection of a diaphragm on which pressure acts by means of a first sensor device arranged on said diaphragm;
  (b) generating a reference signal proportional to the deflection of said diaphragm by a second sensor device arranged on said diaphragm on which the pressure acts, and
  (c) generating from a reference signal, by a microprocessor, a set of measured values from said measurement signal and a set of respective reference values; and wherein:
    (i) a tolerance band for expected values of said set of reference to values is stored in a memory of said microprocessor as a function of said measured values, and
    (ii) said set of reference values currently generated are compared with the expected values from said tolerance band, and either
    (iii) a pressure-induced deflection of the diaphragm is detected when there is a correspondence, and said measured values are output as measured values for the measured pressure; or (iv) if said correspondence is not present, then:
  (1) detecting a deflection of said diaphragm due to a rapid change in temperature;
  (2) correcting said measured values with a correction value; and
  (3) outputting the corrected measured values as measured values for the measured pressure.

15. The method according to claim 14, further comprising the steps of:
  (a) assigning, via a correction value table stored in said memory of said microprocessor, a correction value to each difference value between a reference value outside of the tolerance band and its expected value as a function of the direction of change in a measured value change due to a rapid change in temperature; and
  (b) correcting via said microprocessor, when a rapid change in temperature is detected, said measured values using the correction values from the correction table, which are assigned to the difference between said reference value and said expected value belonging to said measured value.

16. The method according to claim 14, further comprising the step of correcting said measured values, when a rapid change in temperature is detected, by said microprocessor prolonging the integration time for generating said measured values from said measurement signals until said reference values are again within the tolerance band of said expected values of said reference values.

17. The method according to claim 14, wherein said measurement signals are generated by means of a first capacitive sensor of said first sensor device.

18. The method according to claim 17, wherein to detect the deflection in the central area of said diaphragm, said first capacitive sensor is arranged centrally on said diaphragm.

19. The method according to claim 14, wherein said reference signals are generated by means of a second capacitive sensor of said second sensor device.

20. The method according to claim 19, wherein to detect the deflection in the edge area of said diaphragm, said second capacitive sensor is arranged in the edge area of said diaphragm.

* * * * *